US006731565B2

(12) United States Patent
Huang

(10) Patent No.: US 6,731,565 B2
(45) Date of Patent: May 4, 2004

(54) PROGRAMMABLE MEMORY CONTROLLER AND CONTROLLING METHOD

(75) Inventor: Hsiang-I Huang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 0 days.

(21) Appl. No.: 10/064,395

(22) Filed: Jul. 10, 2002

(65) Prior Publication Data

US 2003/0095464 A1 May 22, 2003

(30) Foreign Application Priority Data

Nov. 20, 2001 (TW) ........................ 90128663 A

(51) Int. Cl.$^7$ .............................. G11C 7/22; G11C 8/18
(52) U.S. Cl. ................... 365/230.03; 365/233; 365/194
(58) Field of Search .................. 365/230.03, 23.3, 365/194, 233.5, 198

(56) References Cited

U.S. PATENT DOCUMENTS 6,516,396 B1 * 2/2003 Volk et al. ................... 711/167
6,553,472 B2 * 4/2003 Yang et al. ................... 711/167

FOREIGN PATENT DOCUMENTS

JP       2000112816 A  *  4/2000  ........... G06F/12/02

* cited by examiner

Primary Examiner—Richard Elms
Assistant Examiner—J. H. Hur
(74) Attorney, Agent, or Firm—Jiang Chyun IP Office

(57) ABSTRACT

A programmable memory controller has a main memory device, a command decoder, a period setting device, a command-sequencing device and a command signal output device. When the programmable memory controller needs to access data inside a memory unit, the memory controller sends out a request signal. The command decoder receives the request signal and decodes the request signal to produce command signals. The period setting device receives a control signal and decodes the control signal to produce a period setting signal. The control signal controls the maintenance period of the command signals. The command-sequencing device receives the command signals and the period setting signals to sequence the command signals. The command signal output device receives the sequenced command signals and the period setting signal so that the sequenced command signal is sent to the memory unit during the maintenance period according to indications provided by the period setting signals.

30 Claims, 2 Drawing Sheets

PROGRAMMABLE MEMORY CONTROLLER AND CONTROLLING METHOD

CROSS REFERENCE TO RELATED APPLICATIONS

This application claims the priority benefit of Taiwan application serial no. 90128663, filed on Nov. 20, 2001.

BACKGROUND OF INVENTION

1. Field of Invention

The present invention relates to a memory driver circuit. More particularly, the present invention relates to a driver circuit for controlling memory address addressing and commands.

2. Description of Related Art

Memory inside a personal computer (PC) system normally responds to a triggering signal from a memory control chip within the system. In other words, memory control is initiated by the falling edge of a chip select (CS) signal. According to the command signals and the memory address signals both submitted from the memory control chip, actions that need to be executed by the memory are determined. For example, the actions may include reading the memory content from a specified address or writing data into memory with a specified address. However, memory is also a place for holding and reading any data. Hence, the memory control chip of the PC needs to transmit a great volume of command signals and memory address signals. In general, to access memory data, the memory control chip will send the CS signal simultaneously to each memory unit within a memory module. In the meantime, the memory control chip will also transmit the memory signal first to a memory unit closest to the memory control chip, then transmit the memory signal to a memory unit farther away and so on sequentially. Consequently, when the falling edge of the CS signal arrives at a close memory unit to initiate the reading of a command signal, the memory unit is better able to obtain a command signal at a timing frame identical to the CS signal. On the contrary, when the falling edge of the CS signal arrives at a far away memory unit to read a command signal, due to instability or drift of the command signal, the memory unit can hardly obtain a command signal at a time frame identical to the CS signal. In extreme conditions, a memory unit situated at some distance from the control chip may execute the wrong action. Thus, the system designer must take into account the relationship between the transmission of command signals and memory addresses as well as the layout of memory trace lines on a main circuit board. In other words, both the maintenance period of command signals and the length of trace line leading from the control chip to the memory must be carefully considered.

Since the maintenance period for the CS signal is typically 1T period, the command signal is issued 2T cycles before the submission of the CS signal by convention. Because 2T cycles is a relatively long period, the memory unit can still read the command signal at a time frame identical to the CS signal when the memory unit is triggered by the CS signal, even if the signal transmission distance is long.

However, the two most common types of memory including the synchronous dynamic random access memory (SDRAM) and the double data rate synchronous dynamic random access memory (DDR SDRAM) already operate at a clocking rate of over 100 MHz. Under such high-speed operating condition, the number of cycles for transmitting a memory access command or the number of cycles taken for the command signal to transfer from the memory control chip to the memory unit for both SDRAM and DDR SDRAM is 2T cycles. Therefore, operating speed and performance of a computer system is cut back considerably. The effect is especially prominent when DDR SDRAM is used in the computer system.

SUMMARY OF INVENTION

Accordingly, one object of the present invention is to provide a memory address driver capable of providing a 1T or a 2T period timing command signal to the memory unit depending on actual operating conditions. Aside from increasing the capacity of a computer system to access memory data, the design also improves system stability.

To achieve these and other advantages and in accordance with the purpose of the invention, as embodied and broadly described herein, the invention provides a programmable memory controller. The memory controller includes a main memory controller, a command decoder, a period setting device, a command-sequencing device and a command signal output device. When the programmable memory controller needs to access data within a memory unit, the main memory controller issues a request signal. The command decoder receives the request signal, decodes the request signal and outputs a plurality of command signals. The command-sequencing device receives the command signals and orders the command signals according to a period setting signal submitted from the period setting device. The command signal output device receives the ordered command signals in sequence and controls the maintenance period of various ordered command signal cycles in the process of transferring to the memory according to the period setting signal provided by the period setting device.

The memory access structure inside the programmable memory controller according to this invention utilizes a plurality of command signals to control memory data access. The memory access structure includes a control chipset and a memory slot. The control chipset further includes a built-in programmable memory controller. When the control chipset needs to access data inside the memory, the built-in programmable memory controller inside the control chipset outputs the maintenance period for each command signal period. The memory slot receives the command signal for outputting to the memory.

In one preferred embodiment of this invention, the maintenance period for each command signal period may depend on the traveling distance of the command signal. The traveling distance of each command signal, in turn, depends on the length of trace line from the control chipset to a particular pin inside the memory slot.

Hence, according to the transmission distance of a command signal, a system having two different period maintenance periods, for example, a first period period (1T) and a second period (2T), may be established. In general, a preset distance of travel is often used as a criteria for assigning command signals to the first period or the second period. If travel distance of a command signal is smaller than the preset distance, the command signal is maintained for a first period. On the other hand, if travel distance of a command signal is greater than the preset distance, the command signal is maintained for a second period. In general, the preset distance is a measure of the length of a trace line from a memory slot pin to the control chipset.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
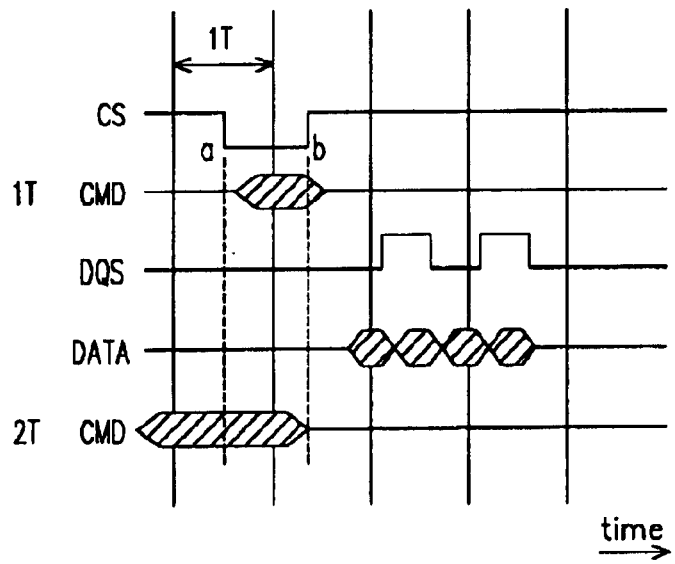
FIG. 1 is a timing diagram showing the signals received by a memory controller according to a preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

To access memory data in the memory inside a computer system, the memory controller of a control chipset (for example, a north bridge chip) on the motherboard will issue a command (CMD) signal and a memory address (MA) signal. In general, the built-in memory controller inside the control chipset will issue a chip select (CS) signal, a CMD signal and an MA signal to the memory. The CS signal selects the desired memory chip for data access. The memory unit is triggered by the falling edge of the CS signal to read the command signal such as row address select (RAS), column address select (CAS) and write enable (WE) sent to the memory unit at an identical time frame. The MA signal triggers the access of data from the chip. However, due to the length of the trace line from the memory controller to the memory unit, the CMD signal is often not correctly read when the memory is triggered by the falling edge of the CS signal.

FIG. 1 is a timing diagram showing the signals received by a memory controller according to a preferred embodiment of this invention. When the memory unit receives the CS signal, the CMD signal is read at an identical time frame during the falling edge of the CS signal, that is, at the time period between a and b. Since the travel distance of the CMD signal from the memory controller to each memory unit is different from the CS signal, the CMD signal may drift to the right under an identical time frame (the dash line section). For a memory unit located far away from the memory controller, a CMD signal having a larger period maintenance period (for example, two clocking cycles or 2T cycles) must be submitted from the memory controller before the CS signal. The CMD signal arrives at the memory unit so that the CMD signal can be read just before the arrival of the triggering CS signal. For a memory unit located close to the memory controller, a CMD signal having a smaller period maintenance period (for example, one clocking period or 1T period) and the CS signal may be submitted at about the same time from the memory controller. The CMD signal arrives just before the CS signal triggers the memory unit.

This invention provides different period maintenance period (1T or 2T) for the CMD signal according to the distance between the control chipset and each memory units so that memory access may attain an optimum efficiency.

Figure 2:
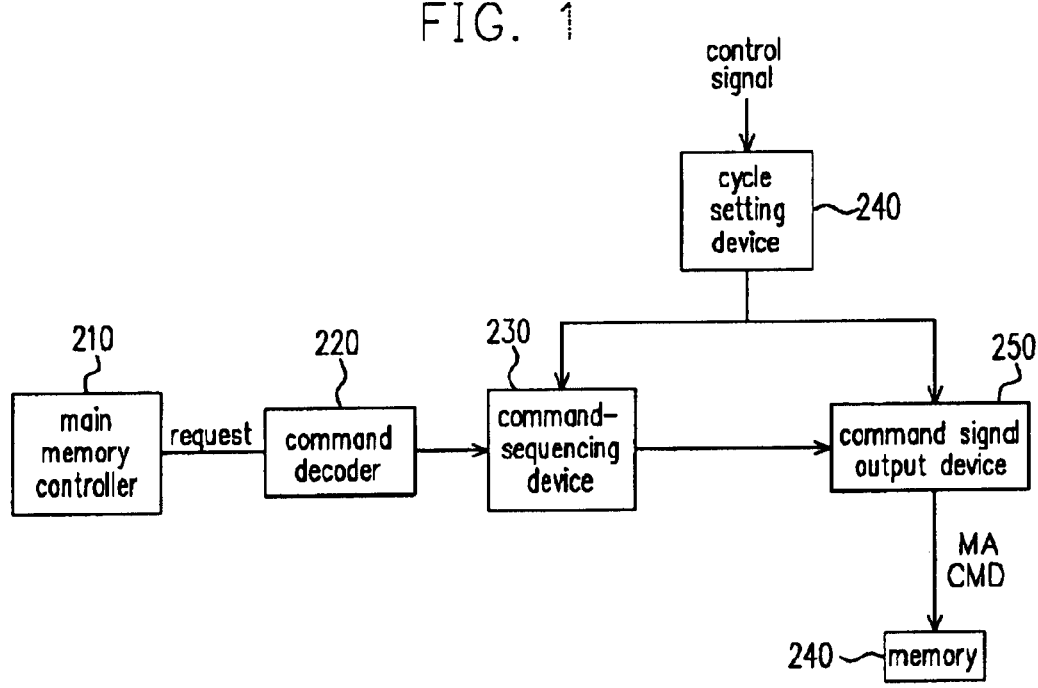
FIG. 2 is a block diagram showing the circuit layout of a programmable memory controller according to one preferred embodiment of this invention.

FIG. 2 is a block diagram showing the circuit layout of a programmable memory controller according to one preferred embodiment of this invention. The programmable memory control chip comprises a main memory controller 210, a command decoder 220, a command-sequencing device 230, a command signal output device 250 and period setting device 240. When the main memory controller 210 needs to use the memory units 260 plugged into the memory slot, a request signal is sent to the command decoder 220. The command decoder 220 receives the request signal and decodes the request signal to produce a plurality of command signals. The command signals are transferred to the command-sequencing device 230. The command-sequencing device 230 receives the command signals and period setting signals from the period setting device 240. According to the period setting signal (setting the period maintenance period for the command signals, that is, signals are maintained according to the set period), the command signals are sequenced and output. When the ordered command signals are sequentially input to the command signal output device 250, the command signal output device 250 also receives the period setting control signal from the period setting device 240 at the same time. Thereafter, the period maintenance period of the ordered command signal submitted from the command-sequencing device 230 is adjusted to the period maintenance period of the command signals of this period setting signal. Note that the period setting signal sets the period maintenance period of the command signal. In general, the period maintenance period can be a 1T period or a 2T period. Finally, the command output device 250 transmits the sequenced and period maintenance period adjusted command signals to the memory unit for controlled reading of data.

The aforementioned control signals may be written down as a program code and stored inside a basic input/output system (BIOS). The program codes may include the maintenance periods required to transmit command signals to various memory units (can be 1T period or 2T cycles). When a request signal is issued, related program code may be retrieved from the BIOS according to the trace length from the memory slot to the control chipset and fed to the period setting device 240 via the control signal for decoding. Thus, the maintenance period for a particular command signal period can be controlled. Furthermore, existing circuits inside a DRAM controller may be used to form the command decoder 220, the command-sequencing device 230, the period setting device 240 and the command signal output device 250. Some variation to fit a particular requirement, or some other means of constructing the circuits, are also permitted.

Figure 3A:
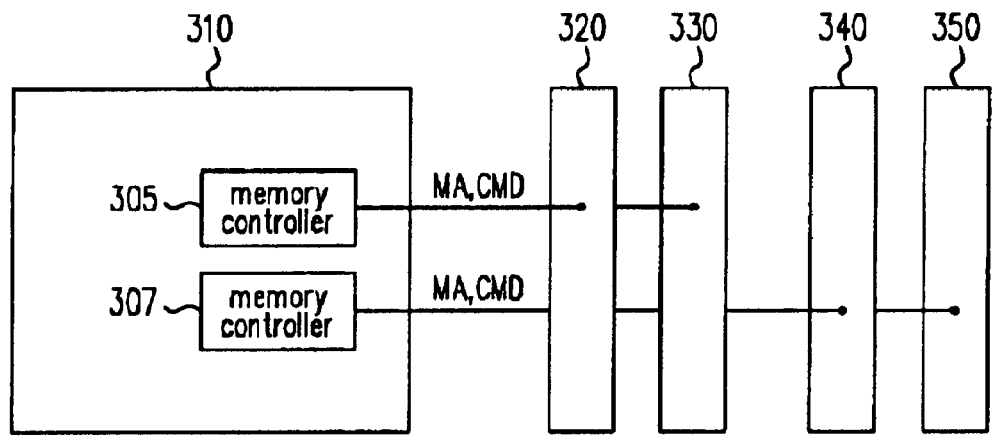
FIG. 3A is a block diagram showing the circuit layout of a memory access structure that incorporates a programmable memory controller according to a first embodiment of this invention.
Figure 3B:
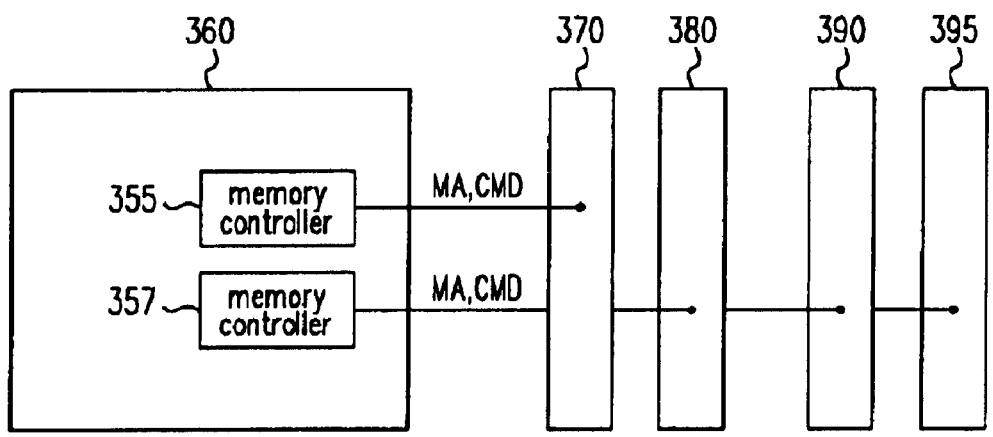
FIG. 3B is a block diagram showing the circuit layout of a memory access structure that incorporates a programmable memory controller according to a second embodiment of this invention.

According to the actual connection between the control chipset and the memory slot on a motherboard, a conventional motherboard having four memory slots thereon is chosen as an example in the following description. FIGS. 3A and 3B are block diagrams showing the circuit layout of a memory access structure that incorporates a programmable memory controller according to a first and a second embodiment of this invention. In FIG. 3A, the control chipset 310 has two memory controllers 305 and 307. The memory controller 305 connects with two memory slots 320 and 330 nearest to the control chipset 310. The other memory controller 307 connects with another two memory slots 340 and 350 farthest from the control chipset 310. A period maintenance period of 1T period is used for sending the command signal from the memory controller 305 to the memory slots 320 and 330. On the other hand, a period maintenance period of 2T cycles is used for sending the command signal from the memory controller 305 to the memory slots 340 and 350. In a slightly different connectivity method shown in FIG. 3B, the control chipset 360 also has two memory controllers 355 and 357. However, the memory controller 355 connects with a memory slot 370 nearest the control chipset 360 only. The other memory controller 357 connects with three memory slots 380, 390 and 395 that are further away from the control chipset 360. similarly, a period maintenance period of 1T period is used for sending the command signal from the memory controller 357 to the memory slot 370. Meanwhile, a period maintenance period of 2T cycles is used for sending the command signal from the memory controller 357 to the memory slots 380, 390 and 395. In practice, the number of memory slots on a motherboard using either 1T or 2T cycles may be determined according to the actual requirements. In general, if the trace length from a memory slot pin to a control chipset (310 or 360) is smaller than 2500 mils, command signals may be transmitted using 1T period. If the trace length is greater than 2500mils, 2T cycles is often preferred.

In addition, a command signal using 1T period maintenance period requires less time to access multiple batches of data from memory than a command signal using 2T period maintenance period. Consequently, command signals using 1T period maintenance period are more suitable for high clocking rate memory while command signals using 2T period maintenance period are more suitable for low clocking rate memory. Thus, if high clocking rate memory such as double data rate synchronous dynamic random access memory (DDR SDRAM) is plugged into a memory slot that uses 1T period command signals, much better results will be obtained with this invention than plugging synchronous dynamic random access memory (SDRAM). Hence, in FIGS. 3A and 3B, the memory slots 320, 330 and 370 can be designed to support DDR SDRAM while the memory slots 340, 350, 380, 390 and 395 can be designed to support SDRAM. In general, to accommodate existing motherboards, both the DDR SDRAM and the SDRAM, will coexist together.

In summary, this invention provides a programmable memory control chip that can set the period maintenance period (1T/2T) of command signals through a period setting device. In addition, the connection between a control chipset on a motherboard and particular memory slot position can be selected. Ultimately, memory-accessing capability of the computer system is optimized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

I claim:

1. A programmable memory controller, comprising:
   a main memory controller for sending a request signal when said programmable memory controller accesses data from a memory unit;
   a command decoder for decoding said request signal to produce a plurality of command signals;
   a period setting device for decoding a control signal to produce a period setting signal, wherein said control signal controls a maintenance period of said command signals;
   a command-sequencing device for ordering and outputting said command signals according to the command signals and said period setting signal; and
   a command signal output device for receiving said ordered command signals and said period setting signal, and controlling said output of ordered command signals outputted to the memory during said maintenance period, according to indications provided by said period setting signal.

2. The memory controller of claim 1, wherein said memory is a synchronous dynamic random access memory (SDRAM).

3. The memory controller of claim 1, wherein said memory is a double data rate dynamic random access memory (DDR DRAM).

4. The memory controller of claim 1, wherein said maintenance period is set according to the travel distance of said command signals.

5. The memory controller of claim 4, wherein said travel distance includes trace length between said control chipset of said memory controller and said memory slot pin of said memory.

6. The memory controller of claim 4, wherein said maintenance period can be a first period or a second period, wherein the first period represents one clock cycle, and the second period represents two clock cycles.

7. The memory controller of claim 6, wherein said maintenance period is the first period if said travel distance is lower than a pre-defined distance and said maintenance period is the second period if said travel distance exceeds said pre-defined distance.

8. The memory controller of claim 7, wherein said pre-defined distance is about 2500 mils.

9. A memory access structure having a programmable memory controller therein, wherein said memory access structure controls a plurality of command signals for accessing data inside a memory unit, comprising:
   a control chipset having a built-in programmable memory controller, wherein said control chipset controls a maintenance period of said command signals output from said programmable memory controller when said control chipset needs to access data inside said memory unit; and
   a memory slot for receiving said command signals and transferring said command signals to the memory unit, wherein said maintenance period of said command signals is determined according to a control signal.

10. The memory access structure of claim 9, wherein said programmable memory controller further comprises:
   a main memory controller for sending out a request signal when said control chipset needs to access data within said memory unit;
   a command decoder for decoding said request signal and reading out said command signals;
   a period setting device for producing a period setting signal according to the control signal, wherein said control signal controls the maintenance period of said command signals;
   a command-sequencing device for ordering and producing new command signals according to said incoming command signals and said period setting signal; and a command signal output device for controlling said maintenance period of said ordered command signals going outputted to the memory slot according to indications provided by said period setting signal.

11. The memory access structure of claim 9, wherein said memory is a synchronous dynamic random access memory (SDRAM).

12. The memory access structure of claim 9, wherein said memory is a double data rate dynamic random access memory (DDR DRAM).

13. The memory access structure of claim 9, wherein a travel distance of said command signals includes trace length between said control chipset and said memory slot pin position.

14. The memory access structure of claim 13, wherein said maintenance period can be a first period or a second period such that said command signals are up for one period if said command signals have first period and said command signals are up for two cycles if said command signals have a second period.

15. The memory access structure of claim 14, wherein said maintenance period is the first period if said travel distance is lower than a pre-defined distance and said maintenance period is the second period if said travel distance exceeds the pre-defined distance.

16. The memory access structure of claim 15, wherein said pre-defined distance is about 2500 mils.

17. A motherboard having a memory unit and a memory controller thereon such that maintenance period for command signals traveling from said memory controller to a memory unit is determined by their distance of separation, said motherboard comprising:
  a memory slot for receiving said command signals and sending said command signals to the memory plugged into said memory slot, wherein said maintenance period of said command signals is set according to a control signal, and said maintenance period is related to the distance of separation between said memory controller and said memory slot;
  a memory controller, comprising:
    a main memory controller for sending a request signal when said programmable memory controller needs to access data from a memory unit;
    a command decoder for decoding said request signal to produce a plurality of command signals;
    a period setting device for decoding said control signal to produce a period setting signal, wherein said control signal controls said maintenance period of said command signals;
    a command-sequencing device for ordering and outputting said command signals according to the command signals and said period setting signal; and
    a command signal output device for receiving said ordered command signals and said period setting signals, and controlling said ordered command signals outputted to the memory during said maintenance period according to indications provided by said period setting signal.

18. The motherboard of claim 17, wherein said memory is a synchronous dynamic random access memory (SDRAM).

19. The motherboard of claim 17, wherein said memory is a double data rate dynamic random access memory (DDR DRAM).

20. The motherboard of claim 17, wherein said travel distance includes trace length between said control chipset of said memory controller and said memory slot pin position.

21. The motherboard of claim 17, wherein said maintenance period can be a first period or a second period, the first period represents one clock cycle, and the second period represents two cycles.

22. The motherboard of claim 21, wherein said maintenance period is the first period if said travel distance is lower than a pre-defined distance and said maintenance period is the second period if said travel distance exceeds said pre-defined distance.

23. The motherboard of claim 22, wherein said pre-defined distance is about 2500 mils.

24. A method of controlling a maintenance period of command signals according to a travel distance between a memory unit and a memory controller, comprising the steps of:
  generating a request signal when data inside said memory unit needs to be accessed;
  decoding said request signal to produce said command signals, wherein said commands signals are sent to the memory unit to initiate data accessing operations;
  decoding a control signal to produce a period setting signal, wherein said control signal controls said maintenance period of said command signals;
  sequencing and outputting said sequenced command signals according to said input command signals and said period setting signal; and
  controlling said sequenced command signals outputted to the memory unit within said maintenance period according to indications provided by said period setting signal.

25. The method of claim 24, wherein said memory is a synchronous dynamic random access memory (SDRAM).

26. The method of claim 24, wherein said memory is a double data rate dynamic random access memory (DDR DRAM).

27. The method of claim 24, wherein said travel distance includes trace length between a control chipset of said memory controller and a memory slot pin position.

28. The method of claim 24, wherein said maintenance period can be a first period or a second period, wherein the first period represents one clock cycle, and the second period represents two clock cycles, wherein the first period is shorter than the second period.

29. The method of claim 28, wherein said maintenance period is the first period if said travel distance is lower than a pre-defined distance and said maintenance period is the second period if said travel distance exceeds said pre-defined distance.

30. The method of claim 29, wherein said pre-defined distance is about 2500 mils.

* * * * *